United States Patent [19]

Yamaguchi et al.

[11] Patent Number: 5,051,161

[45] Date of Patent: Sep. 24, 1991

[54] APPARATUS PRODUCING CONTINUOUSLY ELECTROLYZED WATER

[75] Inventors: Shuji Yamaguchi; Shiroji Misawa; Giichi Asanuma, all of Saitama, Japan

[73] Assignee: Nippon Intek Co., Ltd., Saitama, Japan

[21] Appl. No.: 545,481

[22] Filed: Jun. 28, 1990

[30] Foreign Application Priority Data

Jun. 30, 1989 [JP] Japan .................................. 1-170789

[51] Int. Cl.$^5$ ...................... C25B 15/02; C25B 15/08; C25B 13/00
[52] U.S. Cl. ..................................... 204/229; 204/264; 204/263
[58] Field of Search .......................... 204/229, 263–266

[56] References Cited

U.S. PATENT DOCUMENTS

| | | | |
|---|---|---|---|
| 3,847,787 | 11/1974 | Okazaki et al. | 204/263 X |
| 4,077,862 | 3/1978 | Okazaki | 204/263 X |
| 4,107,021 | 8/1978 | Okazaki | 204/263 |
| 4,119,518 | 10/1978 | Miller | 204/263 |
| 4,169,035 | 9/1979 | Stummer et al. | 204/263 X |
| 4,676,882 | 6/1987 | Okazaki | 204/263 X |
| 4,867,856 | 9/1989 | Okazaki | 204/263 X |

Primary Examiner—Donald R. Valentine
Attorney, Agent, or Firm—Flynn, Thiel, Boutell & Tanis

[57] ABSTRACT

An apparatus producing continuously electrolyzed water is so constructed that the ratio $R_2/R_1$ of the intake amount of cathode water containing abundantly alcali ions to the intake amount of anode water containing abundantly acid ions with respect to that of city water supplied to the electrolytic cell is increased.

5 Claims, 16 Drawing Sheets

APPARATUS PRODUCING CONTINUOUSLY ELECTROLYZED WATER

FIELD OF THE INVENTION

The present invention relates to an improvement of an apparatus producing continuously electrolyzed water, which produces continuously alcali water and acid water by electrolyzing city water, etc.

BACKGROUND OF THE INVENTION

Heretofore apparatuses producing continuously electrolyzed water having a construction indicated in FIG. 9 have been widely utilized.

That is, reference numeral 1 is an electrolytic cell; 2 is a diaphragm; 3 is an anode; 4 is a cathode; 5 is a water inlet; 6 is an anode water outlet; and 7 is a cathode water outlet. When city water is supplied to the electrolytic cell through the water inlet 5 and a DC voltage is applied between the cathode and the anode to electrolyze water, water containing positive ions is collected on the cathode side and water containing negative ions is collected on the anode side. The cathode water and the anode water are separately taken out through the outlets 6 and 7, respectively.

Concerning the utilization of the apparatus producing continuously electrolyzed water described above, it is principally cathode water (alcali water) that is used and it is used as drink water. For this reason, in order to increase the intake amount of the cathode water, the flow rate of the anode water is suppressed by means of a throttle valve 6a with respect to the cathode water, which is principally to be obtained, after water has been electrolyzed.

Further, recently, there is a tendency to use not only the cathode water as drink water but also the anode water (acid water) for external use, or fabrication of foods, cooking, etc. and it is strongly desired to produce more electrolyzed water to increase the intake amount, regardless of whether it is cathode water or anode water.

However, by the construction of the prior art apparatus producing continuously electrolyzed water, e.g. in the case where it is the principal object to take cathode water as described previously, the outlet 6 of the anode water is throttled by means of the throttle valve 6a. The internal pressure in the anode chamber is raised by this throttle and the anode water goes beyond the diaphragm 2 to move to the cathode chamber, where a phenomenon that they are mixed together occurs. This is a bad effect, when more cathode water is taken out. This is true also in the case where there is disposed a throttle valve at the outlet of the cathode water and it is the principal object to take anode water.

Consequently, by the prior art apparatus producing continuously electrolyzed water, it is thought that a flow rate ratio of the main intake amount of cathode water (or anode water): the auxiliary intake amount of anode water (or cathode water), which is equal to about 6:4, is a limit for an amount of water supplied to the electrolytic cell through the water inlet 5, taking the efficiency of electrolysis into account. When it is tried to increase the main intake amount, exceeding it, the anode water (or cathode water) is mixed with the cathode water (or anode water) and thus it is not possible to achieve the expected object.

OBJECT OF THE INVENTION

The main object of the present invention is to provide an apparatus producing continuously electrolyzed water capable of removing the bad effect described above and increasing the ratio of the main intake amount to the auxiliary intake amount from the electrolytic cell to the limit of the efficiency of electrolysis.

SUMMARY OF THE INVENTION

According to the present invention, it is tried to solve the problematical points described above by a construction, in which the cathode chamber and the anode chamber are formed independently from each other so as to be communicated with each other only through a diaphragm portion and a water inlet and a water intake outlet are disposed in each of the cathode chamber and the anode chamber.

In the apparatus producing continuously electrolyzed water having the construction described above, since the cathode chamber and the anode chamber are independent from each other, only exchange movement of ions by electrolysis takes place. In this way, since the cathode water and the anode water are not mixed withe each other, it is possible to increase the main intake amount up to the limit of the efficiency of electrolysis.

DETAILED DESCRIPTION

Figure 1:
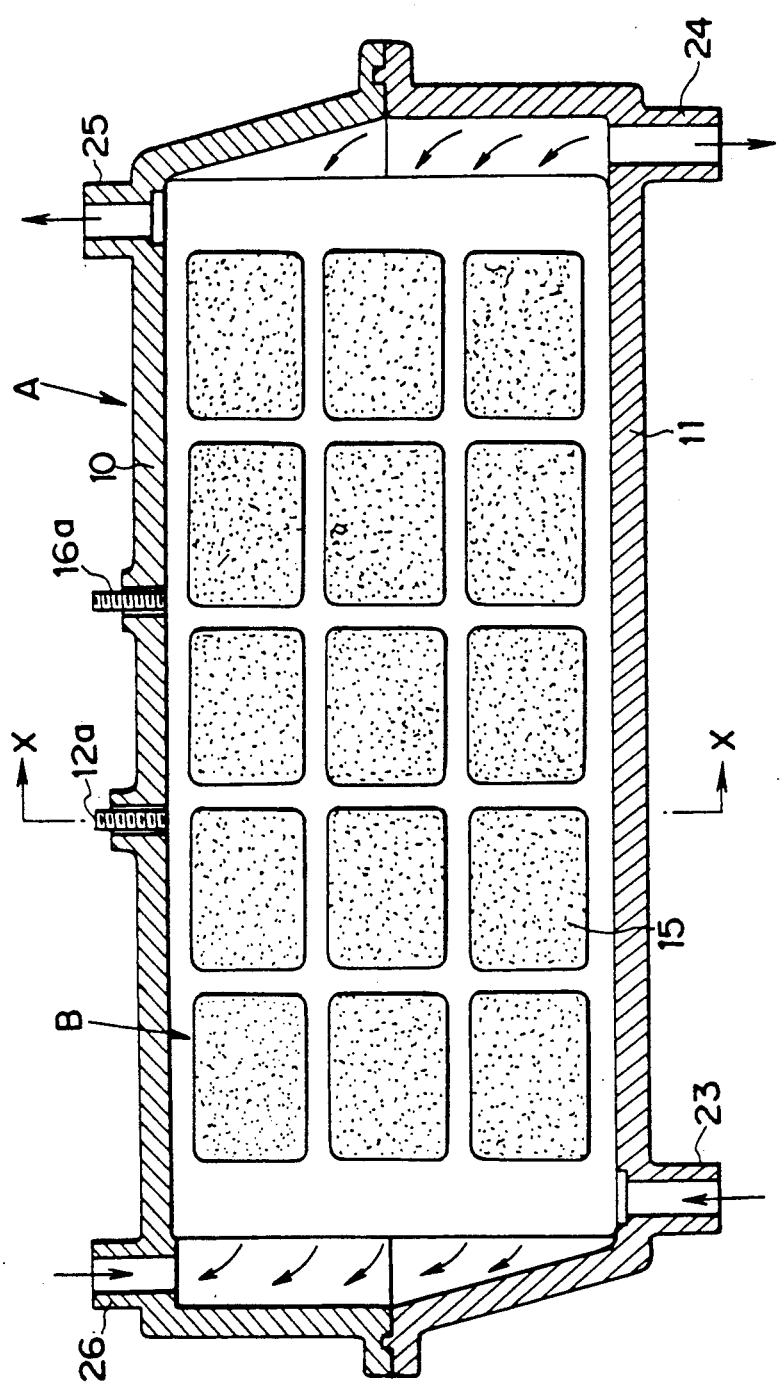
FIG. 1 is a longitudinal side view of an apparatus producing continuously electrolyzed water showing an embodiment of the present invention.
Figure 2:
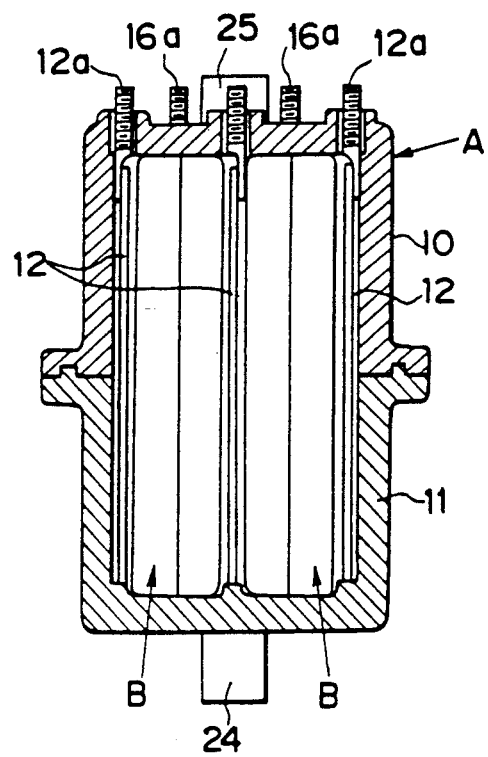
FIG. 2 is a cross sectional view along the line X—X in FIG. 1.
Figure 3:
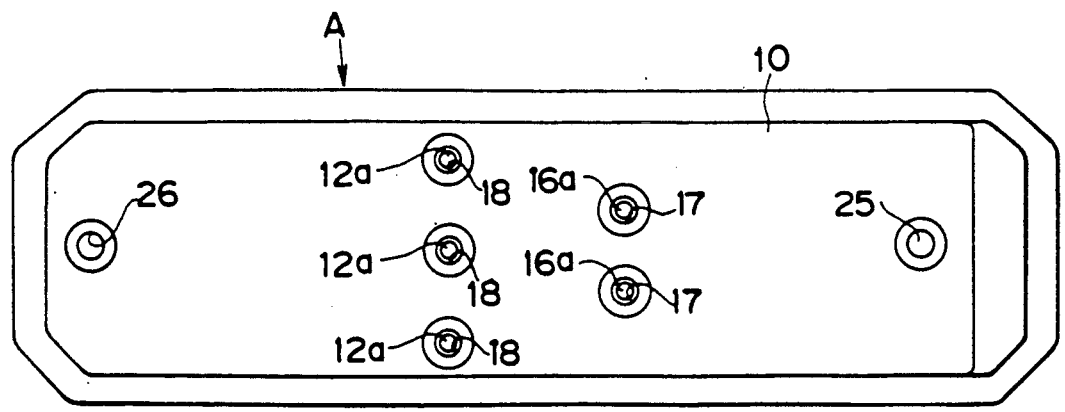
FIG. 3 is a plan view of the apparatus indicated in FIG. 1.
Figure 4:
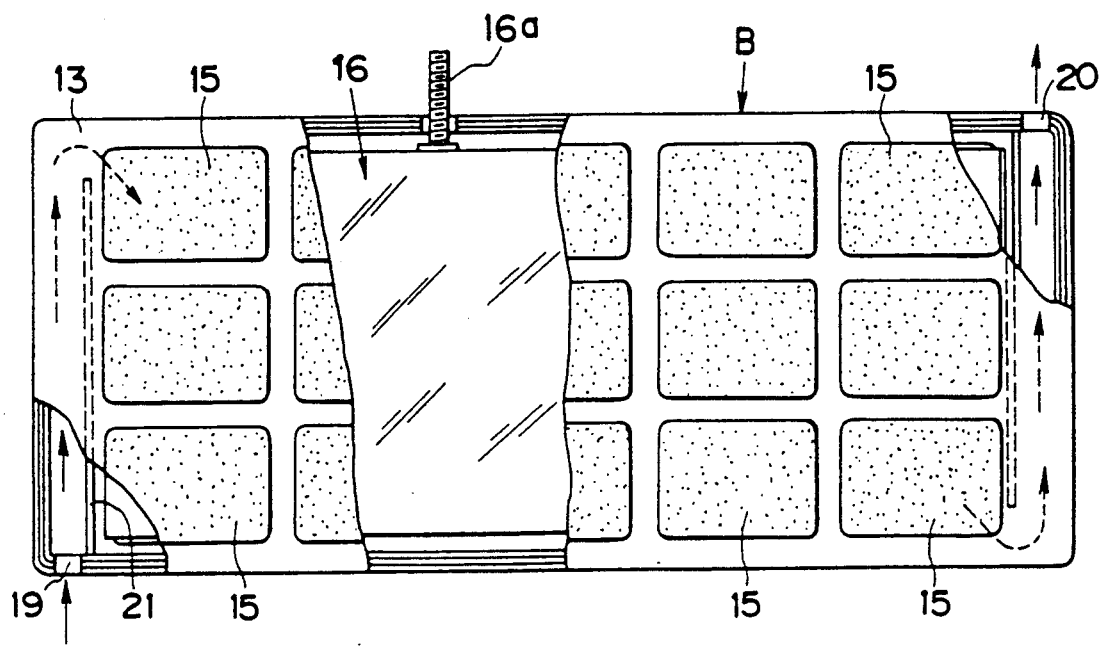
FIG. 4 is a side view of a diaphragm box partly cut off.
Figure 5:
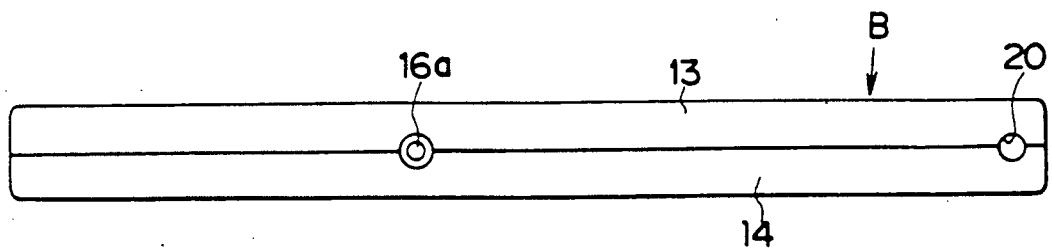
FIG. 5 is a plan view of the diaphragm box indicated in FIG. 4.
Figure 6:
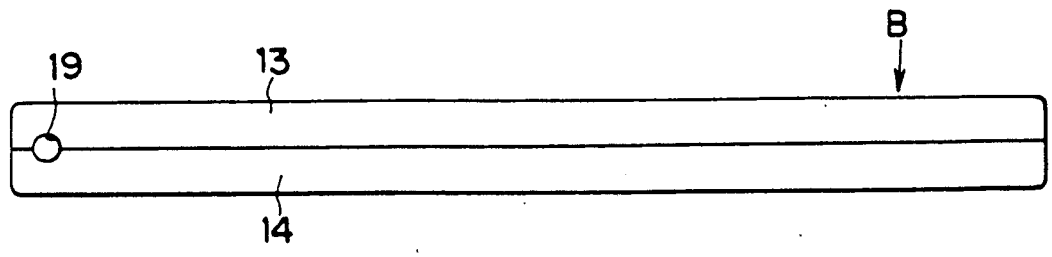
FIG. 6 is a bottom view of the diaphragm box indicated in FIG. 4.
Figure 7:
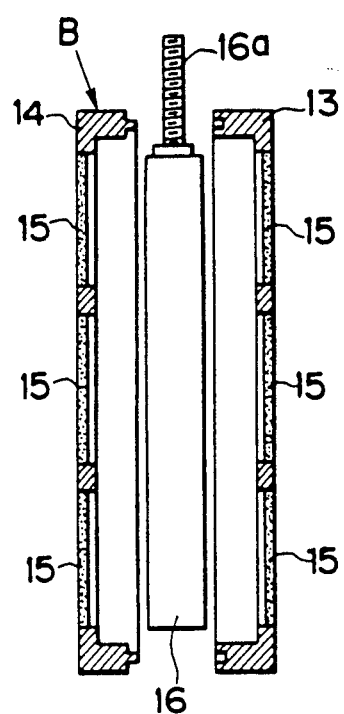
FIG. 7 is an exploded longitudinal cross sectional view of the diaphragm box indicated in FIG. 4.
Figure 8:
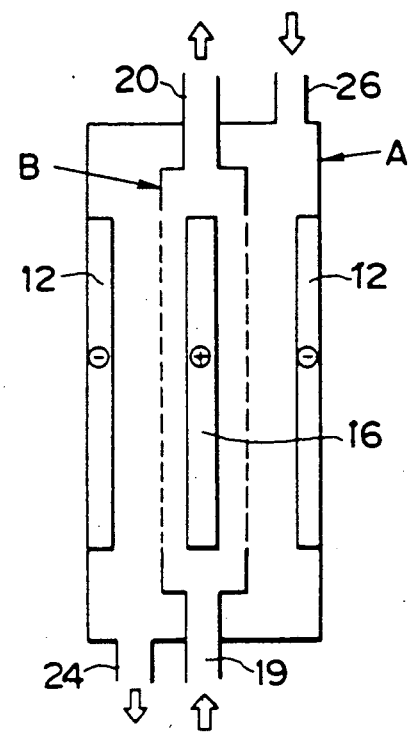
FIG. 8 is a scheme for explaining the construction of the apparatus.
Figure 9:
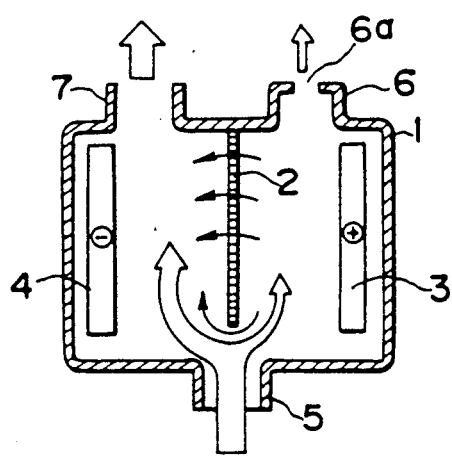
FIG. 9 is a longitudinal cross sectional view of a prior art apparatus producing continuously electrolyzed water.

FIGS. 1 to 7 show an embodiment of the present invention and FIG. 8 is a scheme illustrating the construction thereof.

In the figures, A represents an electrolytic cell made of synthetic resin having a box shape. It is divided into two parts, an upper and a lower parts, and thus consists of divided box parts 10 and 11.

In the box shaped electrolytic cell A described above are located two diaphragm boxes B, in each of which an anode plate is mounted together with a diaphragm, and three cathode plates 12 arranged alternately. Each of the diaphragm boxes B is divided into two in the width direction and consists of divided box parts 13 and 14. 15 is a diaphragm disposed on a lattice shaped side surface of each of the box parts 13 and 14 and 16 is an anode plate located in the diaphragm box B. A feeding terminal 16a of the anode plate 16 located in the diaphragm box B protrudes outward through a hole formed in the diaphragm box B and a hole 17 formed in the upper box part 10 of the electrolytic cell A. On the other hand, a feeding terminal 12a of the cathode plate 12 protrudes outward directly through a hole 18 formed in the upper box part 10.

In the diaphragm box B there are disposed an inlet 19 and an outlet 20. Water supplied through the inlet 19 at the lower portion rises in a path sectioned by means of an inner partitioning plate 21 and enters the anode chamber over the upper extremity of the partitioning plate 21. On the opposite side the water enters another path sectioned by means of another partitioning plate 22 by passing under the lower extremity thereof to rise therein and goes out from the box through the upper outlet 20.

In the lower box part 11 of the box-shaped electrolytic cell A described above there are disposed an inlet 23 for water supply and an intake outlet 24 at the respective extremity portion. On the other hand, in the upper box part 10 there are disposed an intake outlet 25 and an inlet 26 for water supply. Water supplied through the inlet 23 flows in the diaphragm box directly through the inlet 19 of the diaphragm box B and goes out through the outlet 20. Then it is taken out outward directly through the intake outlet 25 of the divided box part 10. On the other hand, water supplied through the inlet 26 for water supply flows through the space (cathode chamber) remaining between the two diaphragm boxes B and the three cathode plates 12 and it is taken out through the outlet 24 of the divided box part 10.

FIG. 8 illustrates the apparatus producing continuously electrolyzed water having the construction described above in such a manner that it can be easily understood. As indicated in this figure, by using the apparatus described above, since the flow paths on the anode side and on the cathode side are independent and separated from each other, it is only exchange movement of ions according to the terminology on the electrolysis that is dealt with and it is possible to intend to increase the flow rate up to the limit of the efficiency of electrolysis for a flow speed. In this way a flow rate ratio, main intake amount:auxiliary intake amount of about 8:2 can be satisfactorily utilized as a practical region and it is possible also to intend to increase the economical efficiency.

By using the construction of the apparatus described above, the property of the produced water can be inverted by inverting electrically the polarity without changing the flow path in the electrolytic cell. Consequently, through a same intake outlet, the object to increase the intake amount can be achieved by inverting the polarity of the DC voltage applied to the electrodes, regardless of whether it is cathode water or anode water.

For supplied city water or underground water there are various sorts of problems such as corruption of the source of water supply, chemical substances existing in extremely small quantities (toxic substances given human bodies bad influences), smell of water, etc. At the present state, where it is impossible to rely only on the city water authority concerning them, it is necessary and inevitable to obtain safe, delicious and healthy drink water personally at each home.

Further, on drink water, it is reported that there is a correlation between the health of a human body and the mineral balance contained in drink water and that drink water has an important relation to illness.

Still further, from the result of a research for studying the relation between pH of water and the life, it is reported that the number of deaths of apoplexy is greater at homes using acid drink water and on the contrary the number of men enjoying longevity is greater at homes using alcali drink water.

When the apparatus producing continuously electrolyzed water described above according to the present invention is used, it is possible to provide an apparatus producing healthy drink water capable of producing delicious, safe and healthy drink water at usual homes in a simple manner by treating supplied water such as city water and underground water.

The apparatus described above is provided with an adsorbing treatment device for adsorbing dirty substances and organic substances to remove them by using the adsorbing action of active charcoal, a microfilter for filtering to remove them by means of a filtering member, a mineral adding device for supplying healthful reagents such as mineral reagents to the water subjected to the adsorption and filtering treatments described above, and an electrolytic cell described previously, which produces continuously alcali water and acid water by electrolyzing the water containing these mineral regents.

By using the apparatus producing healthy drink water having the construction described above, since supplied water such as city water and underground water is subjected to a two-stage treatment by adsorption and filtering and changed into alcali ion water by the electrolysis after having added healthful reagents such as mineral reagents, etc., it is possible to obtain safe, delicious and healthful drink water.

Figure 10:
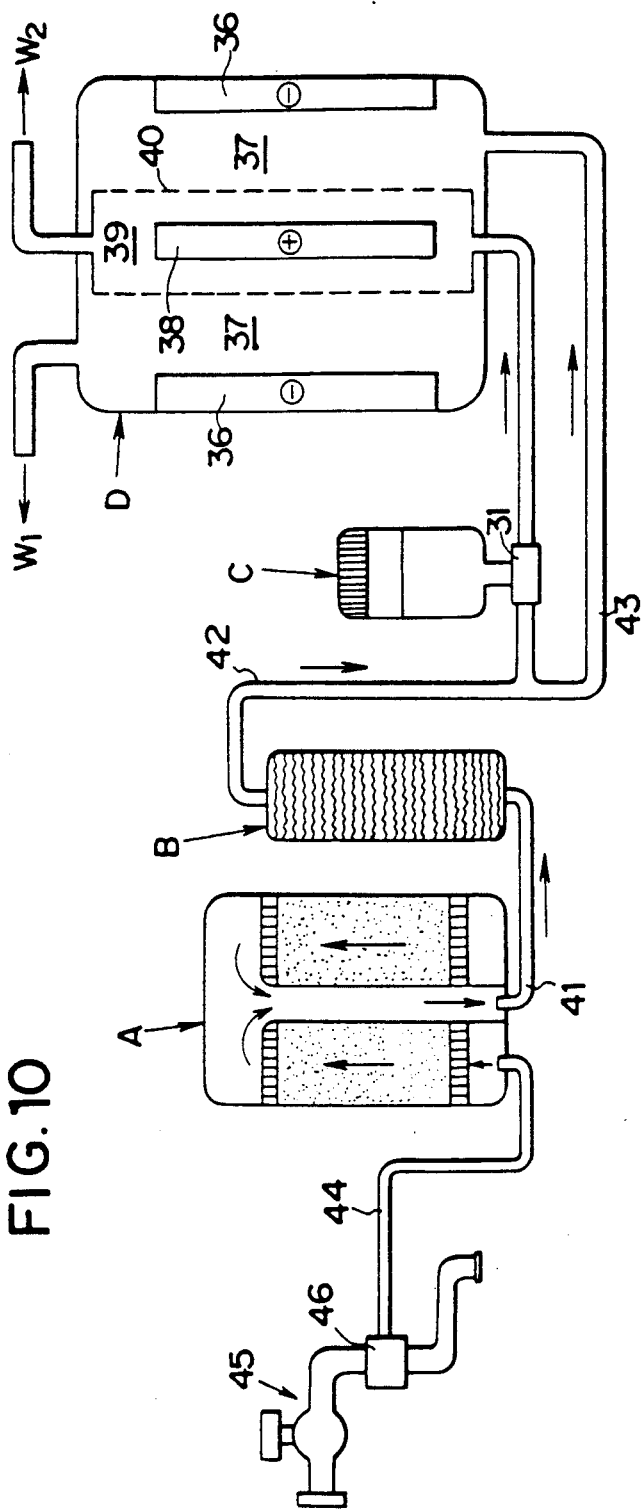
FIG. 10 is a scheme illustrating a system, which is another embodiment of the present invention.
Figure 11:
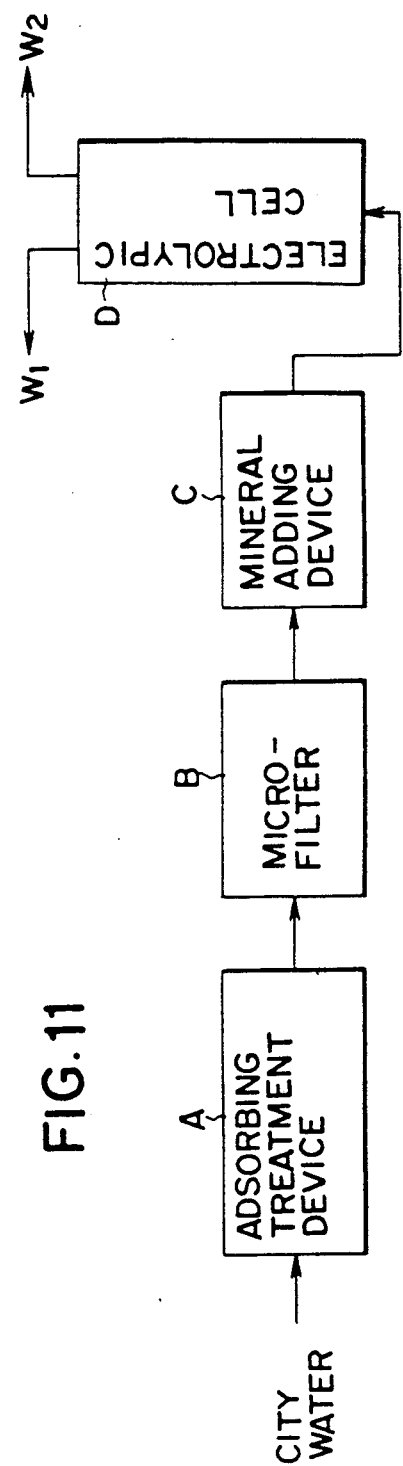
FIG. 11 is a flow chart fro explaining the operation of the system indicated in FIG. 10.

FIG. 10 is a side view of an apparatus producing healthful drink water according to the present invention and FIG. 11 is a flow chart showing the operation thereof.

In the figures, A is the adsorbing treatment device using active charcoal, in which a fixed bed is formed by filling it with active charcoal; B is the microfilter consisting of multiple layers formed by superposing fine porous members; C is the mineral adding device supplying mineral reagents such as calcium, sodium, etc.; and D is the electrolytic cell producing continuously alcali ion water and acid water by electrolyzing water. They are connected one after another through water conducting pipes.

Figure 12:
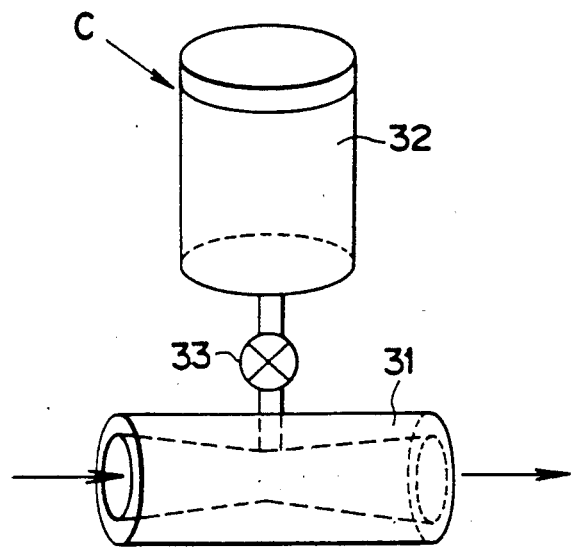
FIGS. 12 and 13 are perspective views of a mineral adding device used in the system indicated in FIG. 10.
Figure 13:
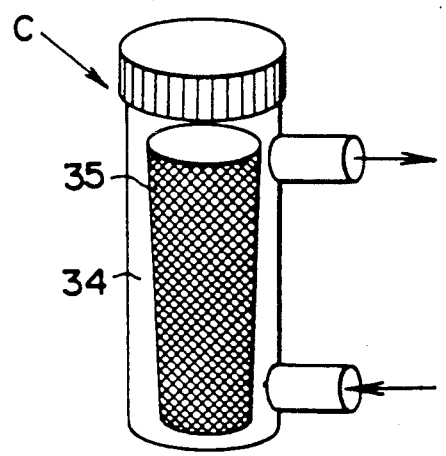

The mineral adding device C generally used has a construction, in which, as indicated in FIG. 12, a tank 32 containing the mineral reagents is connected with an orifice 31 formed in a water conducting pipe through a valve 33 and the mineral reagents contained in the tank is supplied to the water conducting pipe by the actin of negative pressure generated at the orifice, when water is conducted therethrough. This mineral adding device C is not restricted thereto, but it may have a construction, in which, as indicated in FIG. 13, a mesh cylinder body 35 containing the mineral reagents is located in a tank 34 and the mineral reagents are supplied to water through the mesh cylinder body 35 by conducting water upward from the lower portion of the tank.

The electrolytic cell D usually used has a construction, in which the cathode chamber 37, in which the cathode 36 is disposed, and the anode chamber 39, in which the anode 38 is disposed, are formed independently from each other so that they are connected with each other only through the diaphragm 40 and an inlet and an outlet are disposed in each of the cathode chamber 37 and the anode chamber 39.

The outlet side of the adsorbing treatment device A described above using active charcoal is connected with the inlet side of the microfilter B through the water conducting pipe 41 and the outlet side of the microfilter B is connected with the inlet side of the anode chamber 39 of the electrolytic cell D, through the water conducting pipe 42 passing through an orifice 31 of the mineral adding device C. Further the water conducting pipe 43 bifurcated from the water conducting pipe 42 led to the mineral adding device C is connected with the inlet side of the cathode chamber 37 of the electrolytic cell D.

When the apparatus producing healthy drink water having the construction described above is used, the water conducting pipe 44 on the inlet side of the adsorbing treatment device A using active charcoal is connected with a city water cock 45 through a connector 46.

Then, when the city water cock 45 is opened, city water passes through the adsorbing treatment device A and the microfilter B one after another and it is sent to the electrolytic cell D through the mineral adding device C.

There the city water is subjected to the two-stage treatment by adsorption and filtering in the adsorbing treatment device A using active charcoal and the microfilter B using fine filtering member. By this treatment water quality lowering substances, chemical substances existing in extremely small quantities (heavy metals such as chromium, zinc, organic mercury cadmium, etc.), colon bacilli, and other bacilli in general are removed. In particular, the adsorbing treatment device A has a remarkable effect in the removal of ammonium remaining in city water and the microfilter B in the removal of planktons, which have been not removed by the filtering.

A mineral reagent, which is calcium carbonate or sodium carbonate, is supplied to the water subjected to the two-stage treatment of adsorption and filtering by the mineral adding device C, before it arrives at the electrolytic cell D. Then the water flows in the electrolytic cell D, as it is.

In the electrolytic cell D alcali ion water $W_1$ and acid water $W_2$ are produced continuously by electrolyzing the water and ejected to the exterior through the respective outlets. In addition, by this electrolytic operation, nitrogen in ammonium-like and nitric acid-like molecules is reduced. The cathode water (Alcali ion water) going out from the electrolytic cell D is used as drink water, as it is. This drink water obtained by the treatment as described above is safe, delicious and healthful drink water containing mineral components, because almost all the toxic substance contained in city water are removed.

On drink water, it is reported that there is a correlation between the health of a human body and the mineral balance contained in drink water and that drink water has an important relation to illness. Further, from the result of a research for studying the relation between pH of water and the life, it is reported that the number of deaths of apoplexy is greater at homes using acid drink water and on the contrary the number of men enjoying longevity is greater at homes using alcali drink water. According to this report, the content of mineral components in healthy and delicious water is as follows:

Ca—0.87 Na≧5.2 (mg/l) for healthful water, and
Ca—0.87 Na≧2.0 (mg/l) for delicious water.

On the other hand, it is verified that water molecule aggregates (cluster) in the cathode water (alcali ion water) and the anode water (acid water) produced by an apparatus producing electrolyzed water are smaller than those in original water and it is reported also that water including small water molecule aggregates (cluster) is felt to be more delicious and mellower, because it enters more easily taste bud cells.

As described above, by using the apparatus producing drink water described previously, since almost all the dirty substances in water are removed; clusters of water are small; the cathode water has an alcali pH value; and further it is possible to control arbitrarily the mineral balance of calcium, sodium, etc. as components constituting it, it is possible to obtain safe, delicious and healthful drink water, taking the property of original water into account.

Now an embodiment of a water treating apparatus including a water cleaner according to the present invention, using the apparatus producing continuously electrolyzed water, will be explained, referring to FIGS. 14 and 15. This apparatus comprises means for controlling water flow to the water cleaner to have a constant flow rate and means, which displays to inform a user of the fact that the total amount of water flow representing the total sum of the water flow time for the water cleaner, in which water flow at the constant flow rate, reaches a predetermined value.

In the water treating apparatus having the construction described above, since the water flow to the water cleaner is controlled so as to be at a constant flow rate, the total amount of water passing through the water cleaner can be represented by the product of the water flow time and the flow rate. Consequently, the concentration of calcium ions being constant, it is possible to know the filtering power of the water cleaner by comparing the total sum of water passing through the water cleaner with a set value.

FIGS. 14 to 26 show another embodiment of the present invention.

Figure 15:
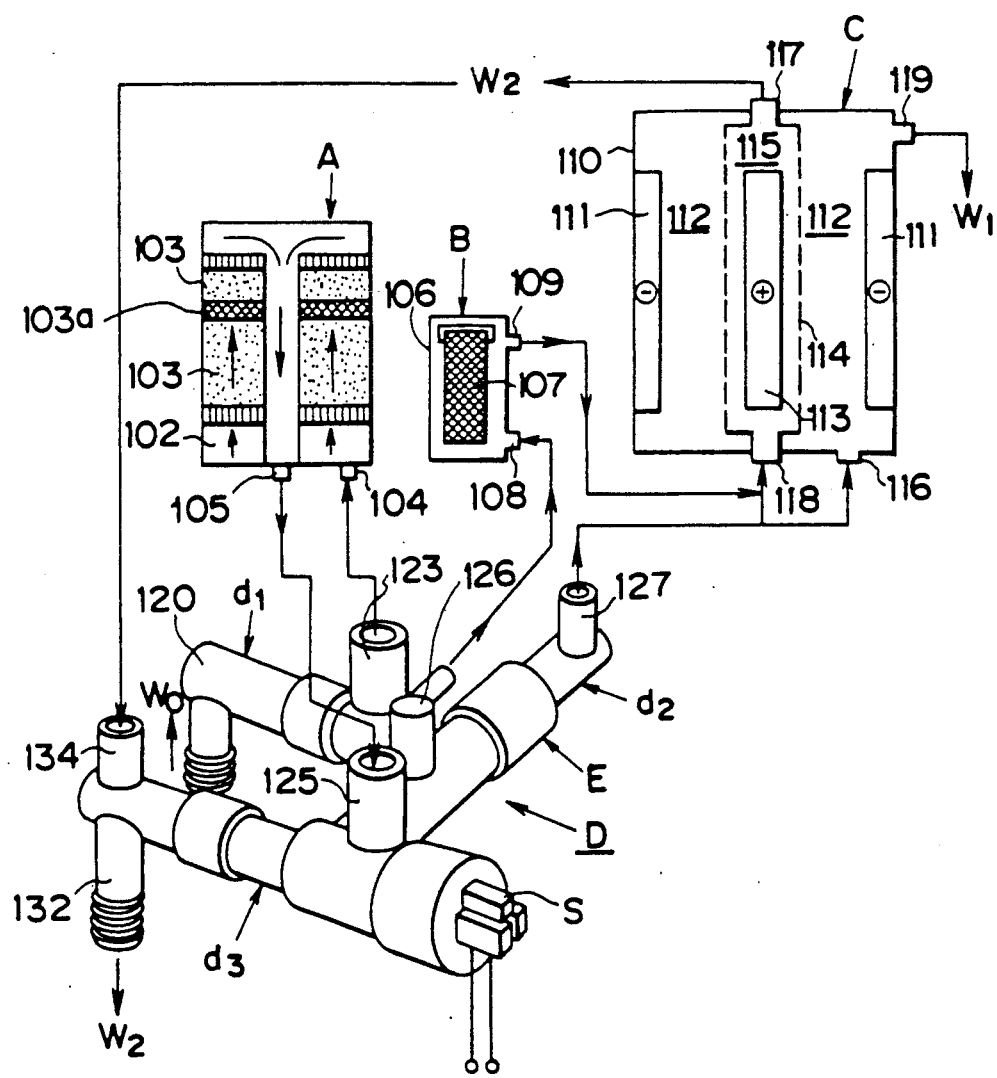
FIG. 15 is a decomposed perspective view of the apparatus indicated in FIG. 14.
Figure 16:
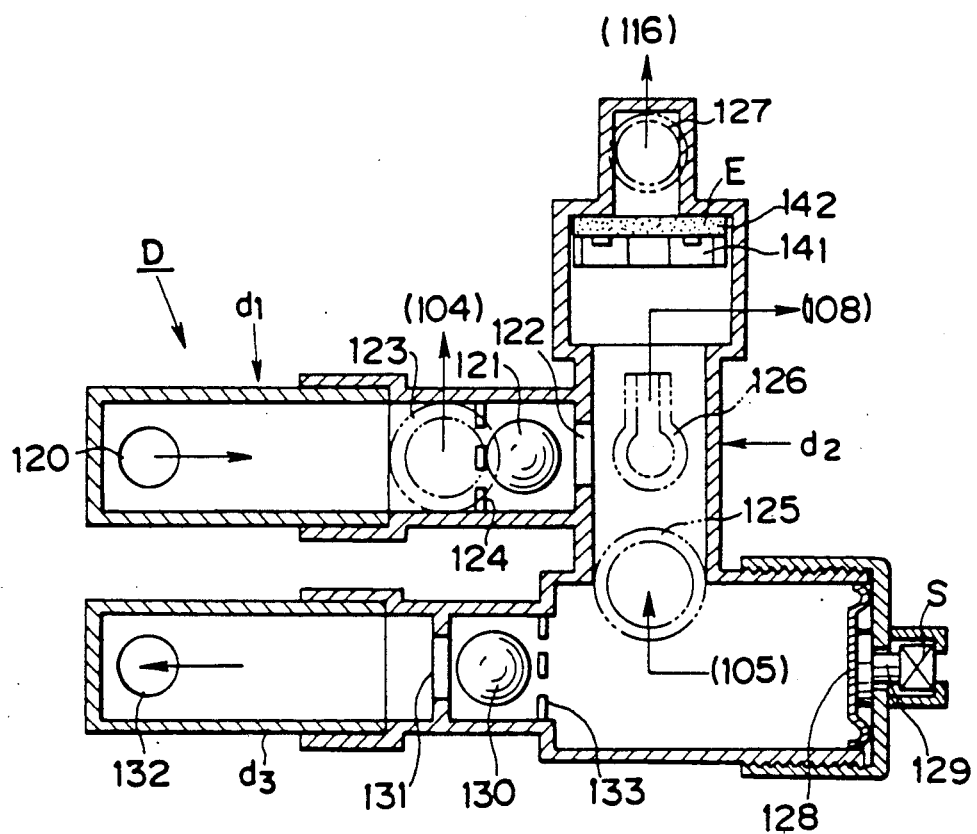
FIG. 16 is a transversal cross sectional view of a concentrated flow path control unit.

The outline of the construction of the principal part will be explained, referring to FIGS. 14 to 16. In the figures, reference numeral 101 is a box-shaped body, in which a plurality of water treating sections are located. Each of the water treating sections is a combination of a water cleaner A, a healthful reagent adding device B, and an electrolytic cell C, which are located therein, in the state where they are connected with a concentrated flow path control unit D.

The water cleaner A is a cleaner, in which a fixed bed is formed by filling a cartridge 102 with active charcoal 103 and reductive inorganic substance 103a, e.g. calcium sulphite, in multiple layers for the purpose described later. 103 is a water inlet and 104 is a water outlet.

The healthful reagent adding device B adds mineral reagent or medicine for promoting nutrition such as calcium carbonate or calcium glycerinate, glycerine B-D-glucose, etc., or vitamin drug to city water Wo to mix them therewith and has a construction, in which water is made pass through a tank 106, where a mesh cylinder 107 containing healthful reagent as described below is located, from the lower portion to the upper portion of the tank so that the healthful reagent is dissolved through the mesh cylinder 107. 108 is a water inlet and 109 is a water outlet.

The electrolytic cell C is constructed by sectioning a cell 110 by means of a diaphragm 114 into a cathode chamber 112, in which a cathode 111 is disposed, and an anode chamber 115, in which an anode 113. 116 is an inlet on the cathode chamber side; 117 is an outlet thereon; 118 is an inlet on the anode chamber side; and 119 is an outlet thereon.

The concentrated flow path control unit D described above is provided with three principal piped paths, i.e. a first piped path $d_1$, a second piped path $d_2$ connected therewith, crossing it at one end thereof, and a third piped path $d_3$ connected with the second piped path $d_2$, crossing it at one end thereof.

The first piped path $d_1$ has a mouth portion 120 for city water connection at one end thereof and a non-return valve portion consisting of a ball 121 and a valve opening 122 is disposed at the position, where it crosses the second piped path $d_2$. At the neighborhood of this ball valve there is disposed a pipe mouth portion 123 connected with the inlet 4 of the water cleaner A described above. 124 is a ball stopping member of the non-return valve portion.

The second piped path $d_2$ has a mouth portion 125 connected with the outlet 105 of the water cleaner A described above at the position, where it crosses the third piped path $d_3$ and at the neighborhood thereof there is disposed a pipe mouth portion 126 connected with the inlet 108 of the healthful reagent adding device B described above. Further, at a position before it, there is disposed a constant flow rate control section E described later and a pipe mouth portion 127 is disposed further behind it, which is connected with the inlet 116 on the cathode chamber side and the inlet 118 on the anode camber side of the electrolytic cell C described above.

The third piped path $d_3$ has a diaphragm 128 driven by variations in water pressure in the piped path at one end thereof. A plunger mounted thereon is linked with a microswitch S disposed outside of the piped path for driving to operate the electrolytic cell. In this way the operation of the electrolytic cell can be stated and stopped and the polarity inversion operation can be effected.

Further, at a position opposite to the diaphragm 128 in the third piped path $d_3$, there is disposed a non-return valve consisting of a ball 130 and a valve opening 131 and a mouth portion 132 of an ejecting pipe used in a case described later is disposed further behind it. 133 is a ball limiting member of the non-return valve portion and 134 is a mouth portion of a ventilation pipe.

The outlet 109 of the healthful reagent adding device B is connected so that water going out therethrough is jointed with water flowing in the inlet 118 on the anode chamber side of the electrolytic cell 109.

Figure 14:
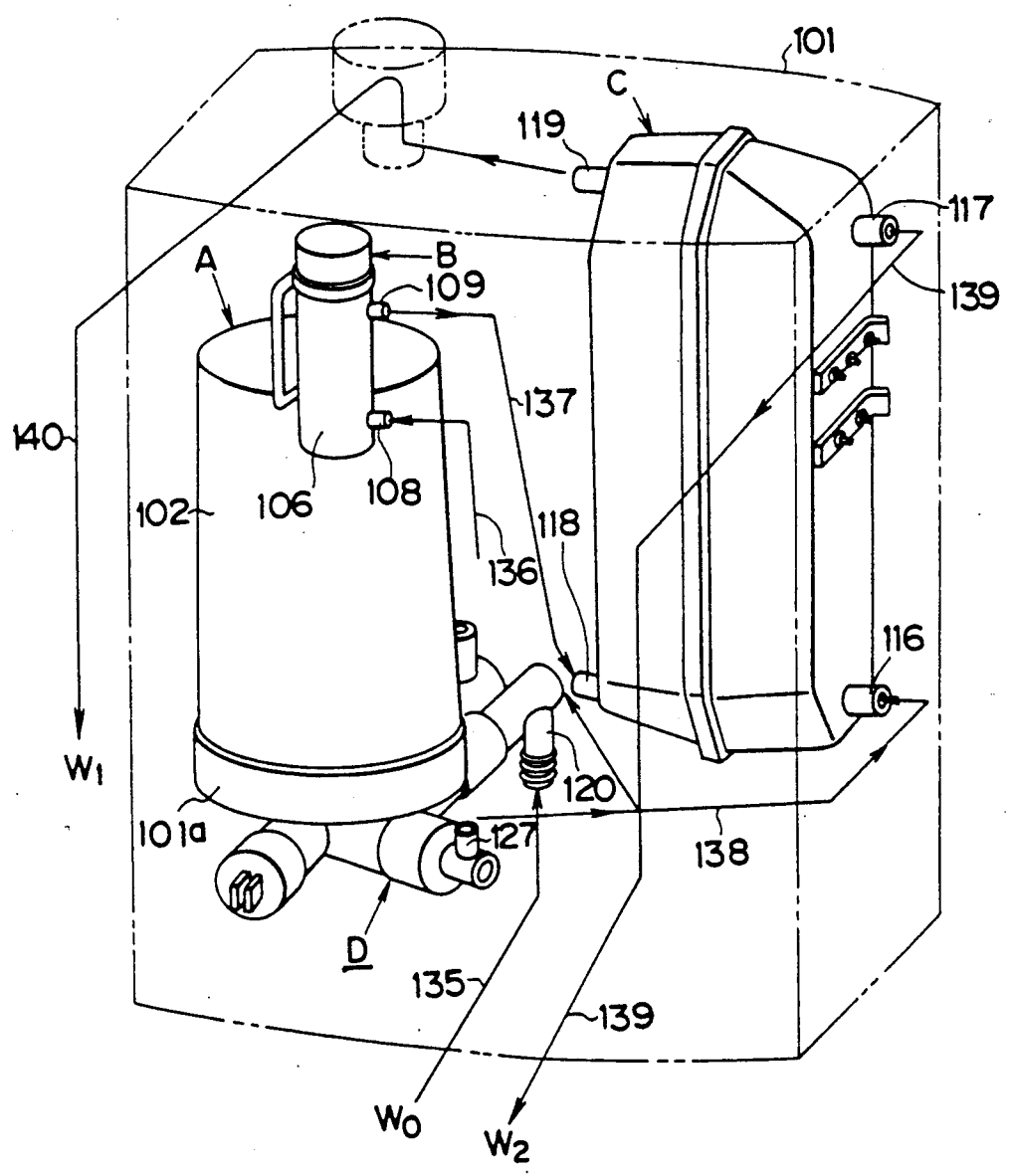
FIG. 14 is a schematical perspective view of a water treating apparatus, which is still another embodiment of the present invention.

In FIG. 14, reference numeral 135 is a hose for conducting city water to the mouth portion 120 of the first piped path; 136 is a hose for conducting water flowing out from the mouth portion 126 of the second piped path to the inlet 108 of the healthful reagent adding device B; 137 is a hose for conducting water flowing out from the outlet 109 of the healthful reagent adding device to the inlet 118 on the anode chamber side of the electrolytic cell C; 138 is a hose for conducting water flowing out from the mouth portion 127 of the second piped path to the inlet 116 on the cathode chamber side of the electrolytic cell; 140 is a hose for taking out alcali ion water $W_1$ flowing out from the outlet 119 on the cathode chamber side of the electrolytic cell C to the exterior; and 139 is a hose for taking out acid water flowing out from the outlet 117 on the anode chamber side to the exterior.

101a is a supporting table, which supports the water cleaner A and at the same time keeps the concentrated flow path control unit D suspended therefrom. Pipe mouth portions 123 and 125 are connected with the inlet 104 and the outlet 105, respectively, through the supporting table 101a.

Figure 17:
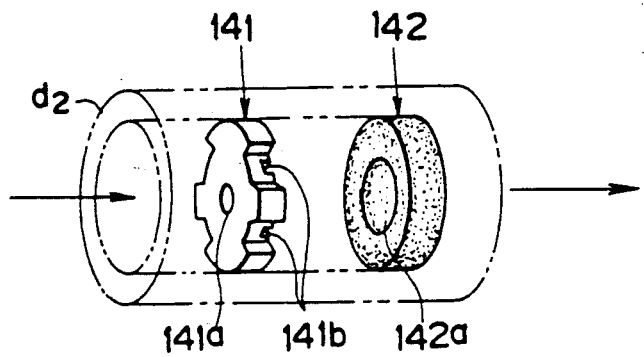
FIG. 17 is an exploded perspective view of a constant flow rate control section.
Figure 18:
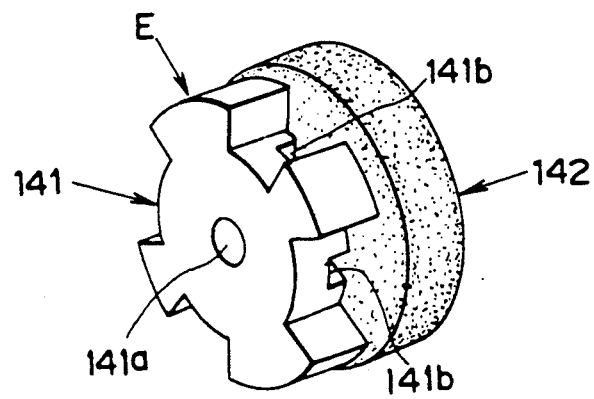
FIG. 18 is a mounted perspective view of the constant flow rate control section indicated in FIG. 17.

The constant flow rate control section E described above consists of a valve body 141 and a seat body 142 made of a rubber like elastic material superposed thereon as indicated in FIGS. 17 and 18. In the valve body 141 there is formed a water conducting hole 141a traversing it in the piped path direction at the central portion thereof and a plurality of water conducting grooves 141b traversing it in the radial direction in the surface portion, which is in contact with the seat body 142. On the other hand, in the seat body 142, there is formed a water conducting hole 142a traversing it in the piped path direction so that it is communicated with the central water conducting hole 141a formed in the valve body 141 described above.

Figure 19:
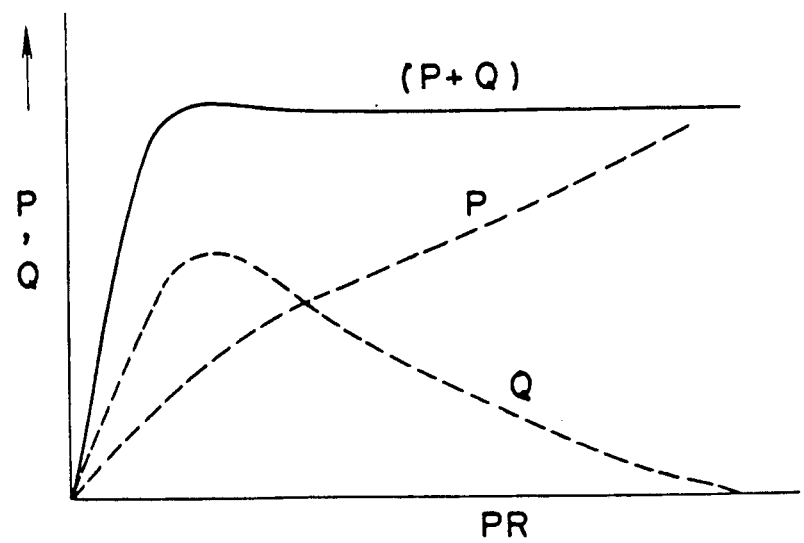
FIG. 19 is a graph indicating the relation between the flow rate and the pressure acting on the valve in the constant flow rate control section indicated in FIG. 17.

In the constant flow rate control section E described above, water in the piped path passes through the two paths, i.e. the central water conducting hole 141a formed in the valve body 141 and the water conducting grooves 141b in the radial direction, to arrive at the central water conducting hole 142a formed in the seat body 142. The flow rate of the water passing through the valve body 141 can be represented by (P+Q), which is the sum of the flow rate P passing through the water conducting hole 141a and the flow rate Q passing through the plurality of water conducting grooves 141b. However, in the case where the water pressure in the piped path is varied, e.g. in the case where the water pressure is increased, since the thrusting pressure acting on the end surface of the valve body 141 increases also, the valve body 141 is thrust in the contacted surface of the seat body 142 made of the rubber like elastic material. Therefore the water conducting cross section of the water conducting grooves 141b is reduced by deformation of the seat body 142 so that the flow rate is also decreased. In this case, the water conducting cross section of the central water conducting hole 141a formed in the valve body 141 is not influenced by variations in the water pressure, but the flow rate increases or decreases proportionally to the water pressure. Consequently, by using the constant flow rate control section E, since the flow rate passing through the valve body 141 is held almost constant regardless of the variations in the water pressure in the piped path, it is possible to hold the amount of water supplied to the electrolytic cell C approximately constant. The graph indicated in FIG. 19 represents the relation between the pressure PR acting on the valve body 141 and the flow rates P and Q described above.

Figure 20:
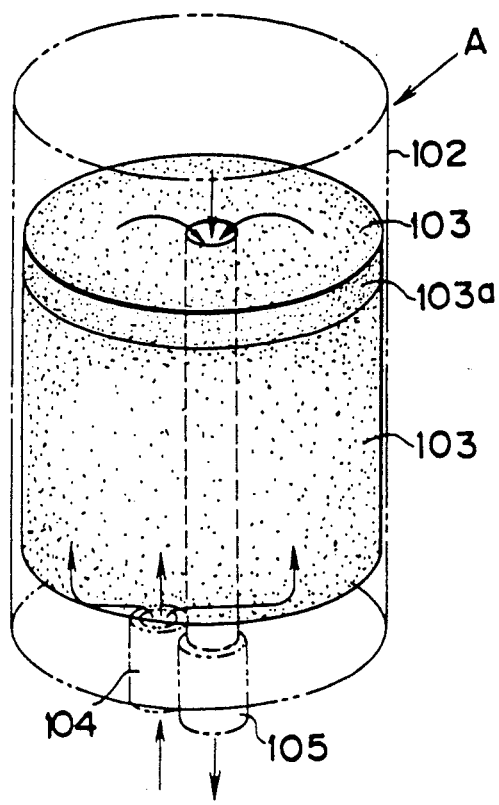
FIG. 20 is a perspective view showing an inner filter layer in a water cleaner.
Figure 21:
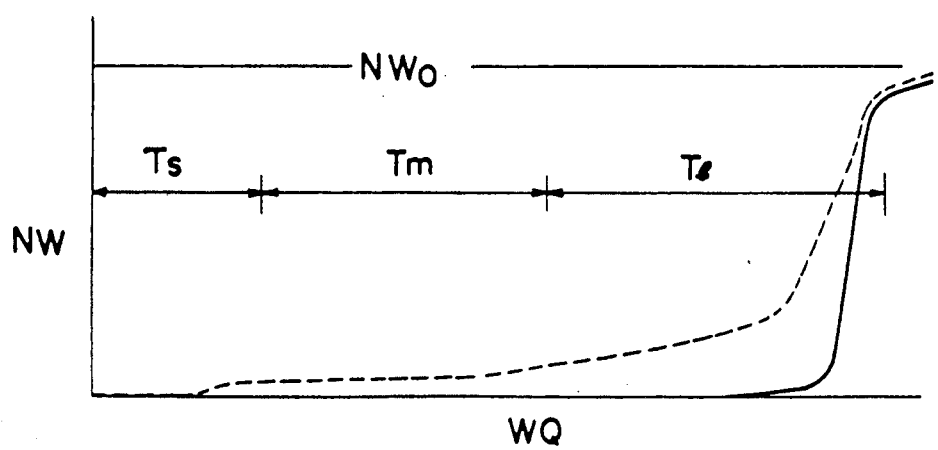
FIG. 21 is a graph indicating a remaining chlorine removing curve for water treated by the water cleaner.

In the water cleaner A, since the filtering efficiency is decreased, if the inlet 104 of the cartridge case 102 is excentric with respect to the cylinder filtering layer, as indicated in FIG. 20, it is so constructed that a flowing-in chamber is formed on the inlet side.

Further the filtering layer in the water cleaner A consists of three layers, i.e. a first layer made of active charcoal 103, a second layer made of reductive inorganic substance 103a, and a third layer made of active charcoal 103, disposed in this order in the direction of the water flow.

In a prior art water cleaner active charcoal is usually used for the filtering substance. However, in the case where a filtering material is made exclusively of active charcoal is used, as indicated by the remaining chlorine removing curve (broken line) in the graph in FIG. 21, where $W_Q$ represents the amount of treated water; $N_W$ the remaining chlorine concentration; and $N_{Wo}$ the remaining chlorine concentration in raw water, the adsorbing power is slow and although the removal thereof is almost complete in the step of the initial period of utilization $T_S$, remaining chlorine, which has been not adsorbed by the active charcoal, passes therethrough in the not treated state in the middle period $T_m$ and the latter period $T_l$ succeeding it. Consequently, in the case where it is considered as drink water, it is subjected to a sterilization treatment by sterilizing water by using chlorine in a water purification plant and organic substances such humic acid, etc. contained in the raw water react with chlorine and hypochlorous acid, which gives rise to a substance called trihalomethane (THM). It is known that this substance is carcinogenic for a human body and thus the sterilization by chlorine causes secondary contamination.

To the contrary, by using the water cleaner consisting of the three layers described above, it is possible to remove the secondary contamination substance and to raise the power of removing remaining chlorine and free chlorine.

That is, the composition of the components of contaminating substances in city water is 1. smell (diosmine, smelling substances such as 2-MIB=vegetable plankton of blue algae), 2. trihalomethane produced by reaction of sterilizing chlorine with humic acid produced by decomposition of vegetable, 3. organic chlorine compounds such as agricultural chemicals, 4. heavy metals (cadmium, lead, mercury, zinc, etc.), 5. remaining chlorine, 6. iron rust, dirty substances, etc.

In the case where these substances are removed by filtering water by means of a filtering material, the substances indicated in 1. to 5. can be removed by using active charcoal. However active charcoal has no selectivity and substances having great molecular weights cannot be adsorbed, depending on the flow speed passing through the filtering material. As the result, as indicated by the graph in FIG. 21, it is found that this takes place from a relatively early point of time.

On the contrary, the water cleaner A consisting of the three layers described above has a function of adsorbing the substances indicated in 1. to 5. in the first layer; giving rise to the reductive reaction of the remaining chlorine, decomposing it into $Cl^-$ and oxygen to change it into harmless substances; and further adsorbing substances, which have not been adsorbed in the first layer, in the third layer; and therefore by using it it is possible to improve the cleaning power represented by the removal of remaining chlorine.

Figure 22:
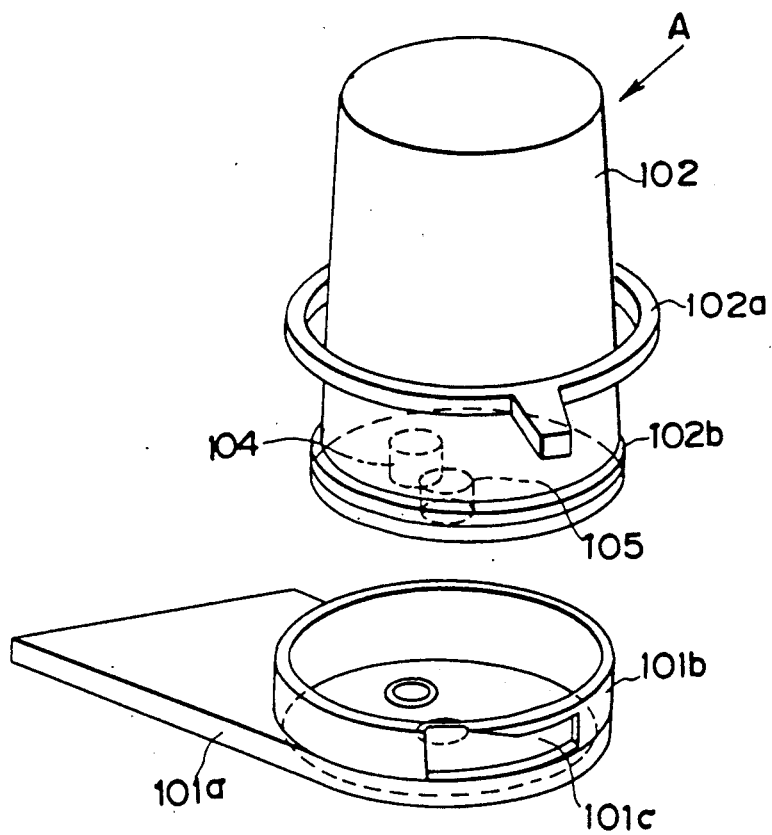
FIG. 22 is an exploded perspective view illustrating means for fixing a cartridge case for the water cleaner.
Figure 23:
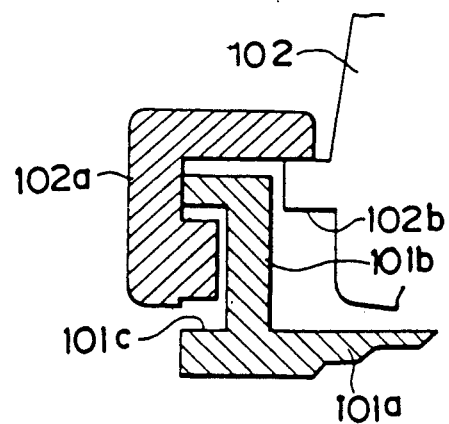
FIG. 23 is an enlarged cross sectional view of the principal part of the fixing means.

FIGS. 22 and 23 show fixing means, in the case where the cartridge case 102 of the water cleaner A is exchanged. That is, it is so constructed that the cartridge case 102 is put within a ring-shaped wall portion 101b disposed on the supporting table 101a and a part of the cartridge case 102 is engaged with a receiving groove 101c aformed in the ring-shaped wall portion 101b by rotating a ring 102a engaged previously rotatably with the case 102 so that at the same time a part of the ring 102a thrusts a ring-shaped protruding edge 102b on the case side.

Next the water treating operation of the constructional part described above will be explained.

When the city water cock (not shown in the figures) is opened, city water flows in the piped paths through the pipe mouth portion 120 of the first piped path $d_1$ in the concentrated flow path control unit D. At this time, the ball 121 is moved by hydraulic pressure so that the valve mouth 122 is shut off. Therefore, water goes out from the pipe mouth portion 123 and flows in the water cleaner A through the inlet 104. Water subjected to the cleaning treatment goes out from the outlet 105 and flows in the second piped path $d_2$ and the third piped path $d_3$ through the piped mouth portion 125 at the crossing portion thereof.

A part of the water in the second piped path $d_2$ goes out from the pipe mouth portion 126 an flows in the healthful reagent adding device B through the inlet 108. The water, to which healthful reagent is added, goes out from the outlet 109 and is sent to the electrolytic cell C through the inlet 118 on the anode chamber side. Further the water in the second piped path $d_2$ passes through the constant flow rate control section E, goes out from the pipe mouth portion 127 and is sent to the electrolytic cell through the inlet 116 on the cathode chamber side and the inlet 118 on the anode chamber side.

On the other side, in the third piped path d₃, the ball 130 is moved so that the valve mouth 131 is shut off. The diaphragm 128 is pushed by the hydraulic pressure generated there and the microswitch S is driven by displacement of the plunger 129. In this was the power supplying circuit (not shown in the figure) for the electrolytic cell C is switched on and thus the electrolic cell starts to be operated.

In the electrolytic cell C alcali ion water (cathode water) and acid water (anode water) are continuously produced by electrolyzing water. The alcali ion water is taken out from the outlet 117 through the hose 139 as drink water and the acid water is taken out from the outlet 119 through the hose 140.

The alcali drink water obtained by the treatment by means of the water cleaner A, the healthful reagent adding device B and the electrolytic cell C is safe and delicious drink water containing healthful reagent components such as minerals, owing to the fact that almost all the toxic substances contained in city water are removed.

Next, when the city water cock is closed to stop the water supply, the hydraulic pressure disappears and diaphragm 128 is returned. Thus the microswitch S is again driven and the operation of the electrolytic cell C is stopped. Further, since the balls 121 and 130 quit the valve mouths 122 and 133, respectively, remaining water in the electrolytic cell and the healthful reagent adding device is returned to the second piped path $d_2$ by the pressure head, passes through the valve mouth 131 and is taken out from the pipe mouth portion 132 to the exterior through a hose (not shown in the figure).

Further a voltage of opposite-polarity is applied to the electrolytic cell by the fact that the diaphragm is returned and a cleaning treatment is effected in a predetermined period of time, during which the remaining water in the electrolytic cell is ejected, and the water is ejected to the exterior through the pipe mouth portion 132 described above.

Owing to the fact that the constant flow rate control section E is disposed in the concentrated flow path control unit D described above, not only the amount of water conducted to the electrolytic cell C is controlled so as to be at an almost constant flow rate, but also in the water cleaner A the flow speed is controlled so as to be always constant.

Figure 24:
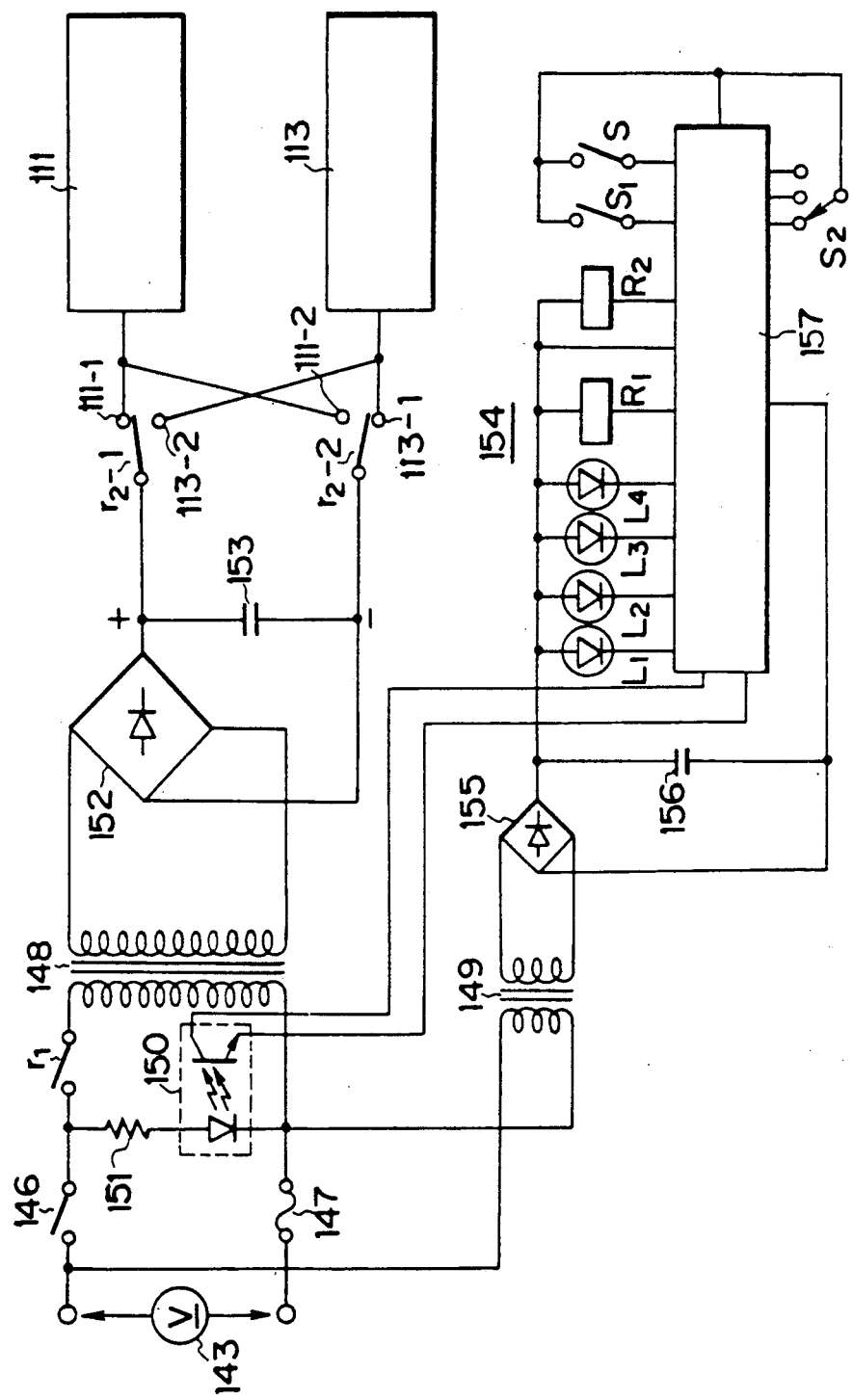
FIG. 24 is an electric circuit diagram therefor.

Now the means for displaying and informing the user of the life of the filtering power of the water cleaner described above will be explained on the basis of the electric circuit indicated in FIG. 24.

In the figure, reference numeral 143 is an AC power supply, which is connected with the primary winding of a transformer 148 through a power switch 146, a fuse 147 and a constant $r_1$ of a relay $R_1$. On the primary side of the transformer, a transformer 149 is connected with the power supply 143 through a fuse 147. Further, on the primary side of the transformer 148, the input of a photocoupler 150 and a resistor 151 are connected with the power supply 143 through the switch 146 and the fuse 147.

A rectifying circuit 152 is connected with the secondary side of the transformer 148. Contacts ($r_2$-1) and ($r_2$-2) of a relay $R_2$ for inverting the polarity of the electrolytic cell described above are connected with the output of this rectifying circuit 152 through a capacitor 153 and the contacts of this relay are so connected that they can be switched over by the control circuit 154.

Another rectifying circuit 155 is connected with the secondary side of the transformer 149.

In the control circuit 154, the output of the rectifying circuit 155 is connected with the relays $R_1$ and $R_2$, a light emitting diode $L_1$ for the display for the power supply, a light emitting diode $L_2$ for the display for the electrolysis, a light emitting diode $L_3$ for the display for the cleaning of the electrolytic cell and a light emitting diode $L_4$ for display for the life of the water cleaner through a smoothing condenser 156 and the output of the microcomputer 157. On the other hand, the input of a microcomputer is connected with a pressure switch S of the concentrated flow path control unit D described above, a water cleaner life reset switch $S_1$, and a calcium ion concentration switching over switch $S_2$. The output of the photo coupler 150 is connected with the input of the micro computer 157.

In the electric circuit having the construction described above, a DC voltage rectified and smoothened through the rectifying circuit 155 and a condenser 156 is applied always from the power supply 143 to the microcomputer, which is prepared in this way for utilization.

Then, when the power switch 146 is turned on, the photocoupler is turned on. The microcomputer 157 detects it and lightens the light emitting diode $L_1$ for the display for the power supply. Next, when the city water cock is opened to supply water, the pressure switch S is driven to be turned on. The microcomputer 157 detects it. The relay $R_1$ is energized and the contact $r_1$ is closed. Then the DC voltage of predetermined polarity from the rectifying circuit 152 is applied to the positive terminal (13-1) of the anode 113 of the electrolytic cell and the negative terminal (11-1) of the cathode through the contacts ($r_2$-1) and ($r_2$-2), respectively, so that the operation of the electrolytic cell is started. At the same time, the microcomputer 157 lightens the light emitting diode $L_2$ for the display for the electrolysis to display that the electrolysis is in the course and begins to count the water conduction time of the water cleaner.

When the city water cock is closed, since the water conduction is interrupted, the pressure switch S is turned off. Thus power supply to the electrodes of the electrolytic cell is cut off and the count of the microcomputer 157 is also stopped. The light emitting diode $L_2$ for the display for the electrolysis is extinguished.

As described above, the water supply and the interruption are repeated and when the count value representing the water conduction time for the water cleaner reaches a set value to be announced (total amount of water passing through the water cleaner), the microcomputer 157 turns on and off the light emitting diode $L_4$ for the display for the life of the water cleaner to inform the user of the time of exchange for the cartridge case of the water cleaner. When the utilization is further continued and the count value reaches a set value for the life, the microcomputer lightens the diode $L_4$ described above to inform the user of the time of exchange for the water cleaner.

Figure 25:
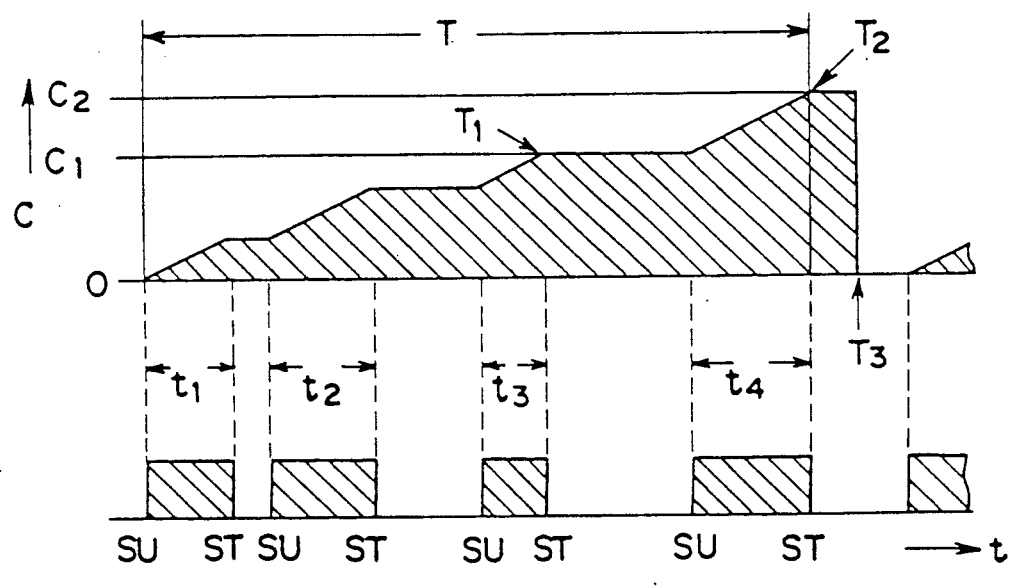
FIG. 25 is a graph indicating the relation between the count value of the time of the water supply to the water cleaner and the filtering power.
Figure 26:
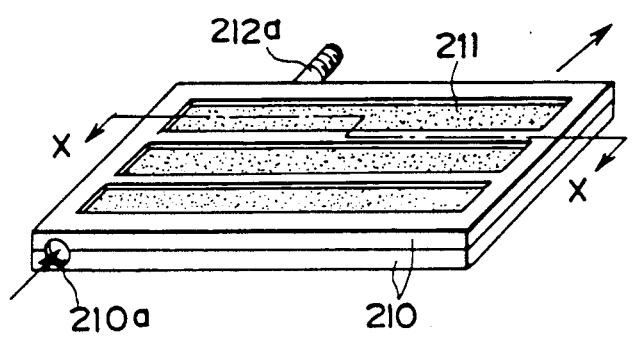
FIG. 26 is a perspective view of a diaphragm assembly used for realizing the present invention.

The graph indicated in FIG. 25 represents variations in the count value C with the lapse of time due to the repetition of the water supply SU and the interruption ST, until it reaches the set value $C_1$ to be announced and the set value $C_2$ for the life, where T is the time from the beginning of the water supply to the point of time, at which the count value reaches the set value for the life, and $t_1$ to $t_4$ represent periods of time, where the counting in the microcomputer is effected. In addition, T is the timing, where the light emitting diode for the display for the life of the water cleaner begins to be switched on and off; $T_2$ the timing, where the diode is lightened; and $T_3$ the timing of the reset of the life of the water cleaner.

Further, in the control circuit 154, it may be possible to inform correctly the user of the time of exchange for the water cleaner by modifying the set value to be announced and the set value for the life for the count value in the microcomputer by setting the calcium ion concentration switching over switch $S_2$, dependent on the calcium ion concentration of the raw water.

After the exchange of the water cleaner cartridge, the water cleaner life reset switch $S_1$ is turned on and the count value in the microcomputer is cleared to prepare the apparatus for the following utilization.

Moreover, the means for controlling the water conduction to the water cleaner so as to be at a constant flow rate is not restricted to the constant flow rate controlling section indicated in the embodiment described above, but any other control means may be arbitrarily used.

Now FIGS. 26 to 30 show an embodiment of the diaphragm assembly suitable for the diaphragm box in the apparatus producing continuously electrolyzed water described previously.

The above embodiment has a construction, in which the diaphragm is formed together with a frame in one body at the fabrication of the frame made of resin, for the diaphragm assembly, which is so constructed that the diaphragm is supported by the frame.

In the diaphragm assembly having the construction described above, it is possible to reduce the thickness of the frame itself to the smallest thickness under the resin formation condition. Further, since the frame and the diaphragm are closely in contact with each other, it is possible to keep the bending as small as possible.

In FIGS. 26 to 30, 210 and 210 represent a pair of resin frames and 211 is a diaphragm made in one body in the state, where it is buried in the resin material, at the fabrication of the resin frame.

The pair of resin frames 210, 210 are so formed that when they are superposed to be engaged with each other, a flat space remains therebetween so that a plate-shaped electrode 212 can be located in the flat space. 212a is a feeding terminal, which protrudes from an end surface of the frames 210 and 210 superposed on each other to the exterior. Further, water inlets 210a for conducting water through the flat space between the frames are formed on the end surfaces of the frames 210 and 210 superposed on each other at the respective extremities of a diagonal.

Figure 29:
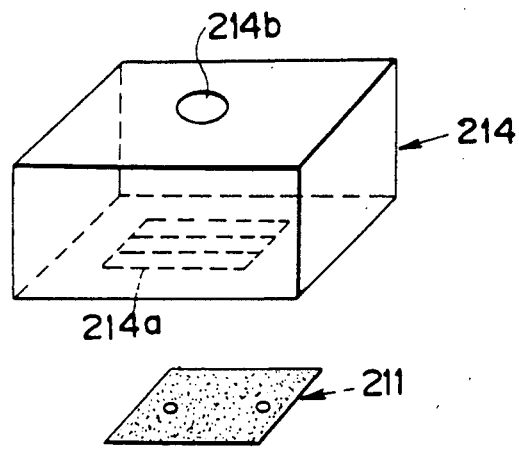
FIG. 29 is a scheme for explaining a method for fabricating the diaphragm by the injection molding.

Although, the frame 210 described above is stripe-shaped, it may be lattice-shaped as indicated in FIG. 29.

Figure 30:
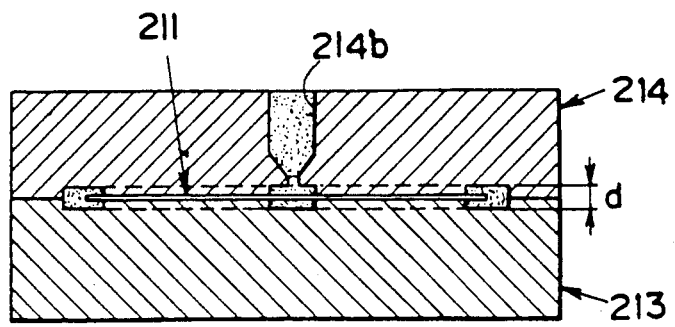
FIG. 30 is a cross sectional view of a die for fabricating the diaphragm by the injection molding.

FIGS. 29 and 30 show a method for fabricating the diaphragm assembly described above by the injection molding.

Figure 27A:
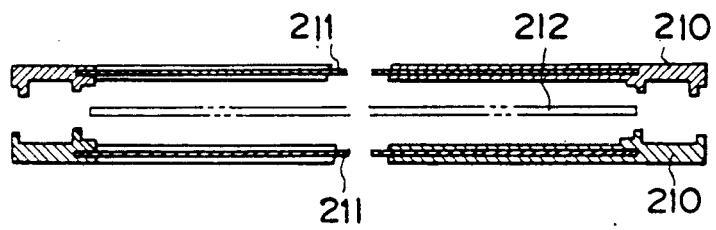
FIG. 27A is a cross sectional view of the diaphragm assembly along the line X—X in FIG. 26.
Figure 27B:
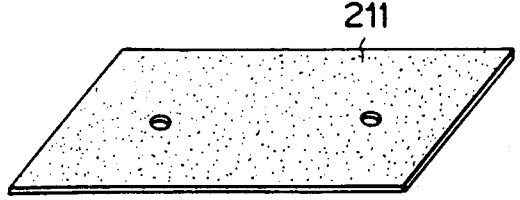
FIGS. 27B and 27C are perspective views of different diaphragms.
Figure 27C:
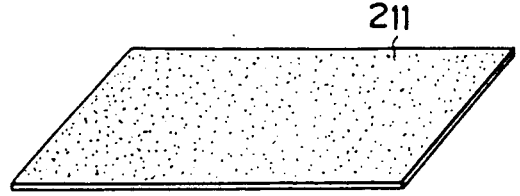
Figure 28:
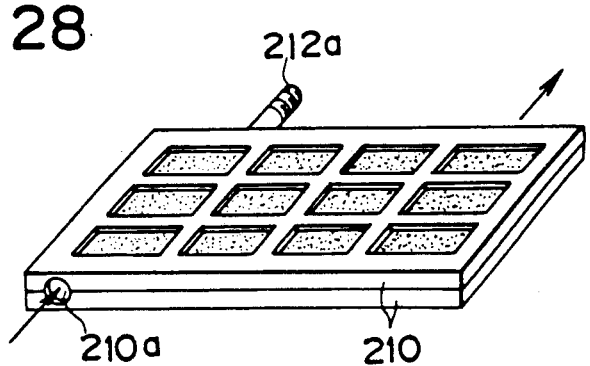
FIG. 28 is a perspective view of a diaphragm assembly showing another embodiment.

That is, 213 is a male die of a die used for the injection molding; 214 is a female die thereof; 213a and 214a are parts, in which resin is injected; and 214b is a pouring gate. The injection molding is effected in the state where a diaphragm is located in the parting of the two dies and the diaphragm assembly having the construction described above can be easily obtained by insert-forming the diaphragm in the injected resin. In the case where the diaphragm has holes as indicated in FIG. 27B, the die used for the injection molding is of pin gate type and in the case where the diaphragm has no holes, it is of side gate type. In either case the frame is formed by injecting resin on both the sides of the diaphragm, putting it therebetween.

By using the construction, in which the diaphragm is put between the resin materials injected on both the sides thereof in one body, as described above, it is possible to reduce the thickness d of the frame, which is effectively the thickness of the diaphragm, to the limit determined by the forming condition (d=1.0 to 1.5 mm) as indicated in FIG. 30.

Further, by using the construction formed in one body, since the frame and the diaphragm are completely in contact with each other, it it possible also to keep the bending as small as possible.

In general, the quantity of matter produced by electrolysis can be expressed by the following equation according to Faraday's law;

$$Q_0 = m/n \; F \cdot q$$

where:
$Q_0$: quantity of matter produced by electrolysis (gr.)
m: mass of produced matter
n: valence
F: Faraday's constant (96500 Coulomb)
q: conducted quantity of electricity $$\begin{aligned} Q_0 &= m/n \, F \cdot q = m/n \, F \cdot I \cdot t \\ &= m/n \, F \cdot V/R \cdot t \\ &= m/n \, F \cdot s/p \cdot d \cdot V \cdot t \end{aligned}$$

where
I: current intensity (Ampere)
t: duration of conduction (sec)
R: electric resistance of water ($\Omega$)
s: area of plate electrode (cm$^2$)
p: proper resistance of water (s/cm)
d: distance between plate electrodes (cm)

Further, denoting the intensity of electrolysis by A and the flow rate b $Q_w$;

$$\begin{aligned} A &= Q_0/Q_w \\ &= m/n \, F \cdot s/p \cdot d \cdot V \cdot Q_w \cdot t \end{aligned}$$

Consequently it can be known that the efficiency of the electrolysis is proportional to the area of the plate electrode, the applied voltage and the duration of conduction and inversely proportional to the distance between the plate electrodes and the flow rate.

The diaphragm assembly having the construction described above has a construction, in which the diaphragm is supported by the frame, and thus it is possible to reduce the thickness of the frame to the smallest size determined by the formation condition by insert-forming the diaphragm in the resin frame. In this way, it is possible to reduce the distance between the plate electrodes and to intend to increase surely the efficiency of electrolysis by the fact that the duration of contact with the plate electrodes at the laminar flow owing to the prevention of the bending of the diaphragm can be utilized with a high efficiency.

As explained above, according to the present invention, it is possible to obtain easily an apparatus producing continuously electrolyzed water capable of increasing remarkably the ratio of the main intake amount to the auxiliary intake amount of the electrolytic cell up to the limit of the efficiency of electrolysis by using extremely simple means.

What is claimed is:

1. An apparatus producing continuously electrolyzed water, comprising:
   an electrolytic cell having a first water supply inlet and a first water intake outlet which each provide fluid communication between an interior of said cell and respective locations external to said cell, and including in said interior thereof a plate electrode serving as one of an anode and a cathode;
   a diaphragm box having a diaphragm and disposed in said electrolytic cell, an interior of said diaphragm box being in fluid communication with said electrolytic cell only through the diaphragm, said diaphragm box having a second water supply inlet and a second water intake outlet which each provide fluid communication between said interior of said diaphragm box and respective locations external to said cell, said diaphragm box having in said interior thereof a further plate electrode serving as the other of said anode and cathode;
   voltage applying means for applying a DC voltage between the plate electrode serving as the anode and the plate electrode serving as the cathode; and
   water supplements for supplying city water to said electrolytic cell through said first and second water supply inlets, said water supply means including:
   an adsorbing treatment device, which adsorbs to remove dirty substances and organic substances contained in the city water by using the adsorbing action of active charcoal;
   a microfilter, which filters to remove substances from the water by means of a filtering material;
   a healthful reagent adding device for supplying a healthful reagent to the water subjected to the adsorbing and filtering treatments; and
   means for supplying the water, to which the healthful reagent is added, to said electrolytic cell through one of said first and second water supplying inlets.

2. An apparatus producing continuously electrolyzed water according to claim 1, wherein said healthful reagent is a mineral reagent.

3. An apparatus producing continuously electrolyzed water according to claim 1, further comprising:
   a concentrated flow path control unit having a water inlet path and a water outlet path for said electrolytic cell, water paths providing communication between said adsorbing treatment device, said microfilter and said reagent adding device, a water pressure sensing path having a drive switch for operating said voltage applying means in response to variations in the water pressure, and a water ejecting path for ejecting water in said adsorbing treatment device, said microfilter and said reagent adding device.

4. An apparatus producing continuously electrolyzed water, comprising:
   an electrolytic cell having a first water supply inlet and a first water intake outlet which each provide fluid communication between an interior of said cell and respective locations external to said cell, and including in said interior thereof a plate electrode serving as one of an anode and a cathode;
   a diaphragm box having a diaphragm and disposed in said electrolytic cell, an interior of said diaphragm box being in fluid communication with said electrolytic cell only through the diaphragm, said diaphragm box having a second water supply inlet and a second water intake outlet which each provide fluid communication between said interior of said diaphragm box and respective locations external to said cell, said diaphragm box having in said interior thereof a further plate electrode serving as the other of said anode and cathode;
   voltage applying means for applying a DC voltage between the plate electrode serving as the anode and the plate electrode serving as the cathode; and
   water supply means for supplying city water to said electrolytic cell through said first and second water supply inlets, said water supply means including:
   a water cleaner;
   means for controlling water conduction to said water cleaner so as to be at a constant flow rate;
   means for displaying and informing a user of the fact that the total amount of water conduction, which is the sum of water conduction time to said water cleaner, through which water is conducted with the constant flow rate, has reached a set value; and
   means for supplying water coming from said water cleaner to said electrolytic cell through said water supplying inlets.

5. An apparatus producing continuously electrolyzed water, comprising:
   an electrolytic cell having a first water supply inlet and a first water intake outlet which each provide fluid communication between an interior of said cell and respective locations external to said cell, and including in said interior thereof a plate electrode serving as one of an anode and a cathode;
   a diaphragm box having a diaphragm and disposed in said electrolytic cell, an interior of said diaphragm box being in fluid communication with said electrolytic cell only through the diaphragm, said diaphragm box having a second water supply inlet and a second water intake outlet which each provide fluid communication between said interior of said diaphragm box and respective locations external to said cell, said diaphragm box having in said interior thereof a further plate electrode serving as the other of said anode and cathode;
   voltage applying means for applying a DC voltage between the plate electrode serving as the anode and the plate electrode serving as the cathode; and
   water supply means for supplying city water to said electrolytic cell through said first and second water supply inlets;
   wherein said diaphragm is supported by a frame which is part of said diaphragm box and is made of resin, and said diaphragm is formed in one body with said frame made of resin at the fabrication thereof.

* * * * *

UNITED STATES PATENT AND TRADEMARK OFFICE
CERTIFICATE OF CORRECTION

PATENT NO. : 5 051 161
DATED : September 24, 1991
INVENTOR(S) : Shuji YAMAGUCHI et al.

It is certified that error appears in the above-identified patent and that said Letters Patent is hereby corrected as shown below:

Column 15, line 27; replace "water supplements" with
---water supply means---.

Signed and Sealed this

Fifteenth Day of June, 1993

Attest:

MICHAEL K. KIRK

Attesting Officer

Acting Commissioner of Patents and Trademarks